(12) United States Patent
Balducci et al.

(10) Patent No.: US 7,841,004 B1
(45) Date of Patent: *Nov. 23, 2010

(54) CHILD IDENTITY MONITOR

(75) Inventors: Michael R. Balducci, Aliso Viejo, CA (US); Arlene E. Miranda, Huntington Beach, CA (US); Michael Burger, Aliso Viejo, CA (US); Nelson Yu, El Monte, CA (US)

(73) Assignee: ConsumerInfo.com, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,936

(22) Filed: Mar. 5, 2010

Related U.S. Application Data

(63) Continuation of application No. 12/028,665, filed on Feb. 8, 2008.

(60) Provisional application No. 60/910,370, filed on Apr. 5, 2007.

(51) Int. Cl.
*G06F 11/00* (2006.01)
*G06F 21/00* (2006.01)
*G06Q 20/00* (2006.01)
*G06Q 40/00* (2006.01)
*H04M 1/66* (2006.01)

(52) U.S. Cl. .................. 726/22; 713/186; 705/76; 705/35; 455/410

(58) Field of Classification Search ......... 705/300–500; 726/1; 713/186; 455/410
See application file for complete search history.

(56) References Cited

U.S. PATENT DOCUMENTS 5,745,654 A 4/1998 Titan
5,819,226 A 10/1998 Gopinathan et al.
5,884,289 A 3/1999 Anderson et al.

(Continued)

FOREIGN PATENT DOCUMENTS

GB 2 384 087 A 7/2003

(Continued)

OTHER PUBLICATIONS

LifeLock, "LifeLock Launches First ID Theft Prevention Program for the Protection of Children," Oct. 14, 2005 Press Release, posted on www.lifelock.com/about-us/press-room/2005-press-releases/lifelock-protection-for-children.html, accessed on Apr. 2, 2007.

(Continued)

*Primary Examiner*—John G Weiss
*Assistant Examiner*—B. Chumpitaz
(74) *Attorney, Agent, or Firm*—Knobbe, Martens, Olson & Bear, LLP

(57) ABSTRACT

An identity monitoring system notifies legal guardians of potentially fraudulent activity associated with their children's identities. The monitoring system may determine if credit files for respective enrolled minors exist and monitor any credit files of the enrolled minors, such as via periodic requests for credit data and comparison of certain returned credit data, in order to determine if potentially fraudulent activity associated with the minor has occurred. The monitoring system provides periodic notifications, such as via email and/or Internet-accessible user interfaces, regarding potentially fraudulent use of their children's identities. In one embodiment, the monitoring system also provides legal guardians with useful information and resources for how they can further protect the identity of their children.

10 Claims, 14 Drawing Sheets

U.S. PATENT DOCUMENTS

| | | | |
|---|---|---|---|
| 5,953,710 | A | 9/1999 | Fleming |
| 6,029,154 | A | 2/2000 | Pettitt |
| 6,094,643 | A | 7/2000 | Anderson et al. |
| 6,330,546 | B1 | 12/2001 | Gopinathan et al. |
| 6,418,436 | B1 | 7/2002 | Degen et al. |
| 6,597,775 | B2 | 7/2003 | Lawyer et al. |
| 6,615,193 | B1 | 9/2003 | Kingdon et al. |
| 6,714,918 | B2 | 3/2004 | Hillmer et al. |
| 6,850,606 | B2 | 2/2005 | Lawyer et al. |
| 7,028,052 | B2 | 4/2006 | Chapman et al. |
| 7,333,635 | B2 | 2/2008 | Tsantes et al. |
| 7,542,993 | B2 | 6/2009 | Satterfield et al. |
| 2002/0032635 | A1 | 3/2002 | Harris et al. |
| 2002/0087460 | A1 | 7/2002 | Hornung |
| 2002/0099649 | A1 | 7/2002 | Lee et al. |
| 2002/0161711 | A1 | 10/2002 | Sartor et al. |
| 2003/0009426 | A1 | 1/2003 | Ruiz-Sanchez |
| 2003/0065563 | A1 | 4/2003 | Elliott et al. |
| 2003/0097320 | A1 | 5/2003 | Gordon |
| 2003/0158751 | A1 | 8/2003 | Suresh et al. |
| 2003/0182214 | A1 | 9/2003 | Taylor |
| 2003/0225692 | A1 | 12/2003 | Bosch et al. |
| 2004/0158723 | A1* | 8/2004 | Root ......................... 713/186 |
| 2004/0177046 | A1 | 9/2004 | Ogram |
| 2004/0230448 | A1 | 11/2004 | Schaich |
| 2004/0243518 | A1 | 12/2004 | Clifton et al. |
| 2005/0021476 | A1 | 1/2005 | Candella et al. |
| 2005/0065874 | A1 | 3/2005 | Lefner et al. |
| 2005/0125686 | A1* | 6/2005 | Brandt ...................... 713/200 |
| 2005/0154664 | A1 | 7/2005 | Guy et al. |
| 2005/0273442 | A1 | 12/2005 | Bennett et al. |
| 2005/0278542 | A1 | 12/2005 | Pierson et al. |
| 2006/0041464 | A1 | 2/2006 | Powers et al. |
| 2006/0080230 | A1 | 4/2006 | Freiberg |
| 2006/0080263 | A1 | 4/2006 | Willis et al. |
| 2006/0101508 | A1* | 5/2006 | Taylor ........................... 726/7 |
| 2006/0173792 | A1* | 8/2006 | Glass ......................... 705/75 |
| 2006/0178971 | A1 | 8/2006 | Owen et al. |
| 2006/0200396 | A1 | 9/2006 | Satterfield et al. |
| 2006/0204051 | A1 | 9/2006 | Holland, IV |
| 2006/0239512 | A1 | 10/2006 | Petrillo |
| 2006/0271457 | A1 | 11/2006 | Romain et al. |
| 2007/0016522 | A1 | 1/2007 | Wang |
| 2007/0038483 | A1 | 2/2007 | Wood |
| 2007/0072190 | A1 | 3/2007 | Aggarwal |
| 2007/0078908 | A1* | 4/2007 | Rohatgi et al. .............. 707/203 |
| 2007/0093234 | A1 | 4/2007 | Willis et al. |
| 2007/0192248 | A1 | 8/2007 | West |
| 2007/0205266 | A1 | 9/2007 | Carr et al. |
| 2009/0106846 | A1 | 4/2009 | Dupray et al. |
| 2009/0119299 | A1 | 5/2009 | Rhodes |
| 2009/0126013 | A1 | 5/2009 | Atwood et al. |

FOREIGN PATENT DOCUMENTS

| | | |
|---|---|---|
| GB | 2 392 748 A | 3/2004 |
| WO | WO 02/27610 A1 | 4/2002 |
| WO | WO 03/071388 A2 | 8/2003 |
| WO | WO 2004/046882 A2 | 6/2004 |

OTHER PUBLICATIONS

LifeLock, "How can LifeLock protect my kids and family?," www.lifelock.com/lifelock-for-people/how-we-do-it/how-can-lifelock-protect-my-kids-and-family.html, accessed on Apr. 2, 2007.

Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.

LifeLock; "How can LifeLock protect my kids and family?," http//www.lifelock.com/lifelock-for-people/how-we-do-it/how-can-lifelock-protect-my-kids-and-family, accessed on Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed on Mar. 14, 2008.

LifeLock, "How LifeLock Works," http://www.lifelock.com/lifelock-for-people, accessed on Mar. 14, 2008.

eFunds Corporation, "Data & Decisioning," Debit Report as downloaded from http://www.efunds.com/web/industry-solutions/financial-services/fr.... on Apr. 1, 2007.

Jacob, Katy et al., "A Case Study of Checking Account Inquiries and Closures in Chicago," The Center for Financial Services Innovation, Nov. 2006.

"Family Identity Theft Protection & Identity Theft Prevention". Lifelock. <http://www.lifelock.com/lifelock-for-people/how-we-do-it/how-can-lifelock-protect-my-kids-and-family>, accessed on Nov. 5, 2009.

"Fraud Alert | Learn How". Fight Identity Theft. <http://www.fightidentitytheft.com/flag.html>, accessed on Nov. 5, 2009.

"TransUnion—Child Identity Theft Inquiry". TransUnion. <https://www.transunion.com/corporate/personal/fraudIdentityTheft/fraudPrevention/childIDInquiry.page>, accessed on Nov. 5, 2009.

"Identity Theft Protection for the Whole Family | FamilySecure.com". FamilySecure.com. <http://www.familysecure.com/>, accessed on Nov. 5, 2009.

LifeLock, "Personal Identity Theft Protection & Identity Theft Products," http://www.lifelock.com/lifelock-for-people, accessed on Nov. 5, 2007.

TheMorningCall.Com, "Cheap Ways to Foil Identity Theft," www.mcall.com/business/columnists/all-karp.5920748jul01,0..., published Jul. 1, 2007.

* cited by examiner

Add/Remove Children

From here you may add a child to your membership, deactivate a child or check the status of your children's profiles. It's the important information you need and the peace-of-mind you deserve.

My Children

To add a child to be monitored, simply key in their appropriate information in each box. Up to five children may be added online. If five aren't enough or if you need to change an existing profile, please call Customer Care at 1-877-481-6826 for assistance. When you're finished, click the "Submit Update" button, if you want to stop monitoring your child's information, check the "Deactivate Child" box on the right and then click "Submit Update" button. Note that when you deactivate your child, you will be unable to view any personal information. Before submitting changes, please be sure to check the "Agree" box ceretifying you are the legal guardian of any children in your membership.

First Child

First Name*   MI   Last Name*                    Generation
John               Smith Social Security number*   Date of Birth*
••• •• ••••               ••••• •• ••••

Deactivate Child ☐

Second Child

First Name*   MI   Last Name*                    Generation
                                                  ▶

Social Security number*   Date of Birth*
[  ] - [  ] - [  ]         ▶  ▶

Confirm Social Security number*
[  ] - [  ] - [  ]         ▶

*FIG. 4A*

Third Child

First Name*  MI  Last Name*  Generation

Social Security number*  Confirm Social Security number*  Date of Birth*

Fourth Child

First Name*  MI  Last Name*  Generation

Social Security number*  Confirm Social Security number*  Date of Birth*

*FIG. 4B*

Fifth Child

First Name*  MI  Last Name*  Generation

Social Security number*  Confirm Social Security number*  Date of Birth*

☐ AGREE  Consumerinfo.com, Inc. will provide information about a child 18 years of age only to the child's parent or gaurdian and only for use to protect the child against fraud, such as the fraudulent opening of credit accounts in the child's name.

I herby certify that I am the parent or guardian of the child(ren) named above, that I am enrolling the child(ren) named above in Child Secure℠ that I understand and agree that enrollment may require Consumerinfo.com, Inc. to obtain information about the child(ren) named above from a credit reporting company, and that any information about the child(ren) named above that I obtain from Consumerinfo.com, Inc. will be used soley for the purpose of protecting against or preventing actual or potential fraud with respect to the child(ren) named above.

CANCEL ▲   SUBMIT UPDATE ▲

FIG. 4C

ChildSecure℠ Home

From here you may conveniently view all children enrolled in your membership, and check their status. Upon enrolling, you will receive an initial status on your children which will be updated each month.

My Active Children

Please see the Key below for explanations of the various status terms. We recommend that you keep up with this information on a regular basis. If you have any questions or need clarification regarding child monitoring, please call one of our knowledgeable Customer Care Center Representatives at 1-877-481-6826. You may also contact us by email at Support@FreeCreditReport.com

| Child's Name | Current Status* | Recent Update |
|---|---|---|
| John Smith | Processing | |

⎱ 510

[ WHAT TO DO IF THERE'S AN ALERT ▲ ]

[ ADD/REMOVE CHILDREN ▲ ]

*Key

| | |
|---|---|
| Processing | Your request is currently being processed. It may take up to 48 hours to conduct our initial search. Please check back soon. |
| ALERT | A credit report or new activity to an existing credit report was detected for your child. Please take immediate action by clicking on the What To Do If There's An Alert button and follow the steps listed. |
| No Activity Detected | No information was returned when we conducted our search for a credit report for your child. This is good news as the majority of children do not have a credit report. |
| No New Activity Detected | No new activity associated with your child's credit report was discovered. If you have not previously discussed the contents of your child's credit report with our Customer Care Center, please do so for further assistance. |

Family Secure℠ Child Protection Home
───────────────────────────────────────

From here you may conveniently view all children enrolled in your membership, and check their status. Upon enrolling, you will receive an initial status on your children which will be updated each month.

My Active Children — Rest easier with any "No Activity Detected" message–as no information was returned. Take immediate action with an "ALERT!" status by clicking the "What To Do If There's An Alert" button. Click the Add/Remove Children button to activate or deactivate your children from your membership.

| Child's Name | Current Status* | Recent Update |
|---|---|---|
| Jane A. doe | No Activity Detected | |
| John J. Doe | ALERT | NEW! |
| Jenna K. Doe | No Activity Detected | |
| Jimmy T. Doe | Processing | |

710

WHAT TO DO IF THERE'S AN ALERT ▲

ADD/REMOVE CHILDREN ▲

**\*Key**

| No Activity Detected | No information was returned OR a previous Alert has been resolved |
| ALERT | Activity was detected– What To Do If There's An Alert |
| Processing | Your request is currently being processed. It may take up to 48 hours to conduct our initial search. Please check back soon. |

*FIG. 7*

What to do if there's an alert for your child

We are carefully monitoring your child's identity. If an alert appears on your child monitoring page, it means that personal information relating to your child's identity was detected.

Please note that this may not mean your child's identity has been compromised.
Know that our Customer Care team is here to help you resolve this matter as quickly as possible

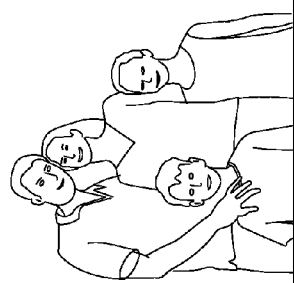

In order to obtain information related to these detected changes, please be ready to provide our representatives with the following documentation:

- Signed copy of <u>Parent/Guardian Certification</u>
- A copy of your child's birth certificate
- A copy of your child's Social Security Card
- A copy of your Driver's License or other government-issued ID
- Documentation verifying your address (i.e. a recent utility bill)

Contact our Fraud Resolution Representatives, please call: 1-866-369-0418, Monday-Friday from 6 a.m. to 6 p.m. Saturday-Sunday 8 a.m.-5 p.m. (Pacific Time)

CHILDSECURE℠ HOME

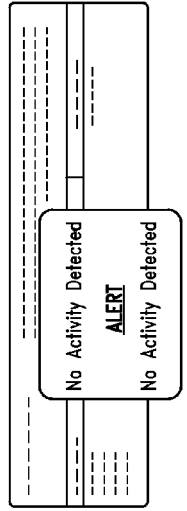

If your child has an "Alert," this what you will see under "Current Status" on your "ChildSecure" home page. To take immediate action, please follow the instructions shown here.

Parent/Guardian Certification Form

We are carefully monitoring your child's identity. If your child's current status shows an "Alert" please be ready to fax this completed form to our Fraud Resolution Representatives. Please note that an "Alert" may not mean your child's identity has been compromised.

First Name _____ Last Name _____

Street Address _____

_____ Apt. _____

City _____ State _____ Zip _____

Daytime Phone _____ Evening Phone _____

Please note that if more than one of your children shows a current status of "Alert," you will need to fill out a separate form for each child.

Child's Name _____

Consumerinfo.com, Inc. will provide information about a child under 18 years of age only to the child's parent or guardian and only for use to protect the child against fraud, such as the fraudulent opening of credit accounts in the child's name.

I hereby certify that I am the Parent or guardian of the child named above, that I have enrolled the child named above in Triple Advantage with ChildSecure[SM], that I understand and agree that enrollment required Consumerinfo.com, Inc. to obtain information about the child named above from a credit reporting company, and that any information about the child named above that I may obtain from Consumerinfo.com, Inc. will be used solely for the purpose against or preventing actual or potential fraud with respect to the child named above.

Signature _____ Date _____

*FIG. 9*

| | TOMMY SMITH Credit Activity | Report | BILLY JONES Credit Activity | Report | SARA JONES Credit Activity | Report | Report to Mr. Jones |
|---|---|---|---|---|---|---|---|
| Month 1 | Enrolled – No file | No Activity | Enrolled | | | | |
| Month 2 | File found – AMEX credit card | ALERT | No file | No Activity Detected | | | No Activity Detected |
| Month 3 | File found – AMEX credit card | No New Activity Detected | No file | No Activity Detected | | | No Activity Detected |
| Month 4 | File found – AMEX credit card & new address | ALERT | No file | No Activity Detected | Enrolled | | No Activity Detected |
| Month 5 | File found – AMEX credit card & Hospital Collections Account | ALERT | No file | No Activity Detected | No file | No Activity Detected | Alerted |
| Month 6 | File found – AMEX credit card | ALERT | No file | No Activity Detected | File found – new address | Alerted | No Activity Detected |
| Month 7 | File found – AMEX and VISA credit card | ALERT | No File | No Activity Detected | File found with same new address | No New Activity Detected | No Activity Detected |
| Month 8 | No File | No Activity Detected | No file | No Activity Detected | File found with same new address | No New Activity Detected | Alerted |
| Month 9 | File found – Mastercard credit card | ALERT | No file | No Activity Detected | No file | No Activity Detected | No Activity Detected |

FIG. 10

CHILD IDENTITY MONITOR

CROSS-REFERENCE TO RELATED APPLICATIONS

This application is a continuation of U.S. patent application Ser. No. 12/028,665 filed on Feb. 8, 2008, entitled "CHILD IDENTITY MONITOR," which claims the benefit of priority under 35 U.S.C. §119(e) of U.S. Provisional Application No. 60/910,370 filed on Apr. 5, 2007, entitled "SYSTEMS AND METHODS FOR PROVIDING LEGAL GUARDIANS WITH INFORMATION REGARDING POTENTIALLY FRAUDULENT USE OF A MINOR'S IDENTITY." The disclosures of both applications are hereby incorporated by reference in their entireties.

BACKGROUND OF THE INVENTION

1. Field of the Invention

This invention relates to systems and methods for detecting potentially fraudulent use of a minor's identity.

2. Description of the Related Art

Identity theft is the act of using someone's personal information—such as an account number, driver's license, health insurance card or Social Security number—and using the assumed identity to commit fraud or theft. Identity theft is one of the fastest growing crimes in the nation. In 2007, the Federal Trade Commission estimated that as many as 9 million Americans have their identities stolen each year. Identity thieves may rent an apartment, obtain a credit card, clone your ATM or debit cards and make electronic withdrawals in your name, take out major loans in your name and not pay off the debtor, establish a telephone account in your name, as well as a number of other fraudulent activities. You may not find out about the theft until you review your credit report or a credit card statement and notice charges you didn't make—or until a debt collector contacts you.

Children, including infants, toddlers, youngsters, and teens comprise one of the fastest-growing segments of identity theft victims. For young victims, the damage can be even more devastating than for their adults. Children may be particularly targeted by identity thieves because they typically have clean credit records, making it easy for the criminal to create new accounts. Additionally, because most parents (or other legal guardians) don't check to see if their child has a credit record, the crime can go undetected for years causing many child identity thefts to remain undiscovered until the youngster apples for a driver's license or first job. Thus, systems and methods for monitoring the misuse of a child's identity are desired.

SUMMARY OF THE INVENTION

The systems, methods, and devices of the invention each have several aspects, no single one of which is solely responsible for its desirable attributes. Without limiting the scope of this invention, certain features will now be discussed briefly. After considering this discussion, and particularly after reading the section entitled "Description of Certain Embodiments" one will understand how the features of this invention provide advantages that include, for example, an identity monitoring system that notifies legal guardians of potentially fraudulent activity associated with their children's identities. In one embodiment, the legal guardian is also provided with dedicated fraud resolution support services if a child's identity has been compromised. In one embodiment, the monitoring system also provides legal guardians with useful information and resources for how they can further protect the identity of their children.

In one embodiment, a computerized method of monitoring unauthorized use of a child's identity comprises receiving personally identifying information from a legal guardian for enrolling the legal guardian in one or more credit services, the legal guardian information comprising at least a name, an address and a social security number of the legal guardian; receiving personally identifying information associated with a child, the child information comprising one or more of: a name, an address, a social security number, and a maiden name of the child's mother; receiving an electronic certification from the legal guardian certifying that the legal guardian truly is the legal guardian of the child; and periodically providing information to the legal guardian regarding the presence or absence of potentially fraudulent activity associated with the child, wherein the periodically providing comprises performing the following method on a periodic basis: receiving credit information associated with the child; in the event that the credit information associated with the child indicates no activity associated with the child in each of a public record, a tradeline, a credit inquiry, an employer, and an address portion of the credit information, transmitting an electronic communication to the legal guardian indicating that no activity has been detected; in the event that the credit information associated with the child indicates new activity that was not indicated in credit information previously received for the child in one or more of the public record, the tradeline, the credit inquiry, the employer, and the address portions of the credit information, transmitting an electronic communication to the legal guardian indicating that potentially fraudulent activity has been detected; and in the event that the credit information associated with the child indicates only the same activity that was also indicated in credit information previously received for the child in one or more of the public record, the tradeline, the credit inquiry, the employer, and the address portions of the credit information, transmitting an electronic communication to the legal guardian indicating that no new activity has been detected.

In one embodiment, a computerized method of monitoring credit activity associated with a minor comprises receiving information from a legal guardian of a minor certifying that the legal guardian is a legal guardian of the minor that is authorized to receive credit information associated with the minor, periodically requesting a credit file associated with the minor, after each periodic request for the minor's credit file, comparing the content of a newly received credit file with a previously received credit file for the minor and, in response to the comparing, notifying the legal guardian of potentially fraudulent activity if the newly received credit file comprises data indicating activity associated with the minor in one or more of a public record, tradeline, credit inquiry, employer, and address portions that is different than data in a previous credit file in the respective one or more portions.

In one embodiment, a child fraud monitoring system comprises an enrollment module to receive information from an adult, the information comprising child information identifying a specific child and certification information indicating that the adult is a legal guardian of the child, a monitoring module to monitor credit data associated with the child in order to determine if potentially fraudulent use of the child's identity has occurred, the monitoring module being configured to periodically request credit data associated with the child and, in response to the content of the credit data in relation to the content of the previously received credit data for the minor, determine whether potentially fraudulent use of the child's identity has occurred, and a reporting module to communicate to the adult whether potentially fraudulent activity has occurred, wherein the reporting module is configured to transmit an email or other electronic communication to the adult when the monitoring module indicates that potentially fraudulent activity has occurred.

BRIEF DESCRIPTION OF THE DRAWINGS

FIG. 4 illustrates one embodiment of a user interface for enrolling minors in an identity monitoring service.

FIG. 5 illustrates one embodiment of a user interface comprising a status pane that includes information regarding each minor enrolled in the identity monitoring service that is associated with a particular legal guardian.

FIG. 7 illustrates a status pane listing three minors that are enrolled in the monitoring service and one minor for which the enrollment process has not yet been complete.

FIG. 8 illustrates a user interface that provides information regarding what can be done by the legal guardian in response to receiving an alert notification from the monitoring system.

FIG. 9 illustrates one embodiment of an exemplary certification form.

FIG. 10 is a table illustrating certain credit-related activities associated with three exemplary minors over a nine-month time period, as well as the identity monitoring statuses associated with each of the minors during that time period.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
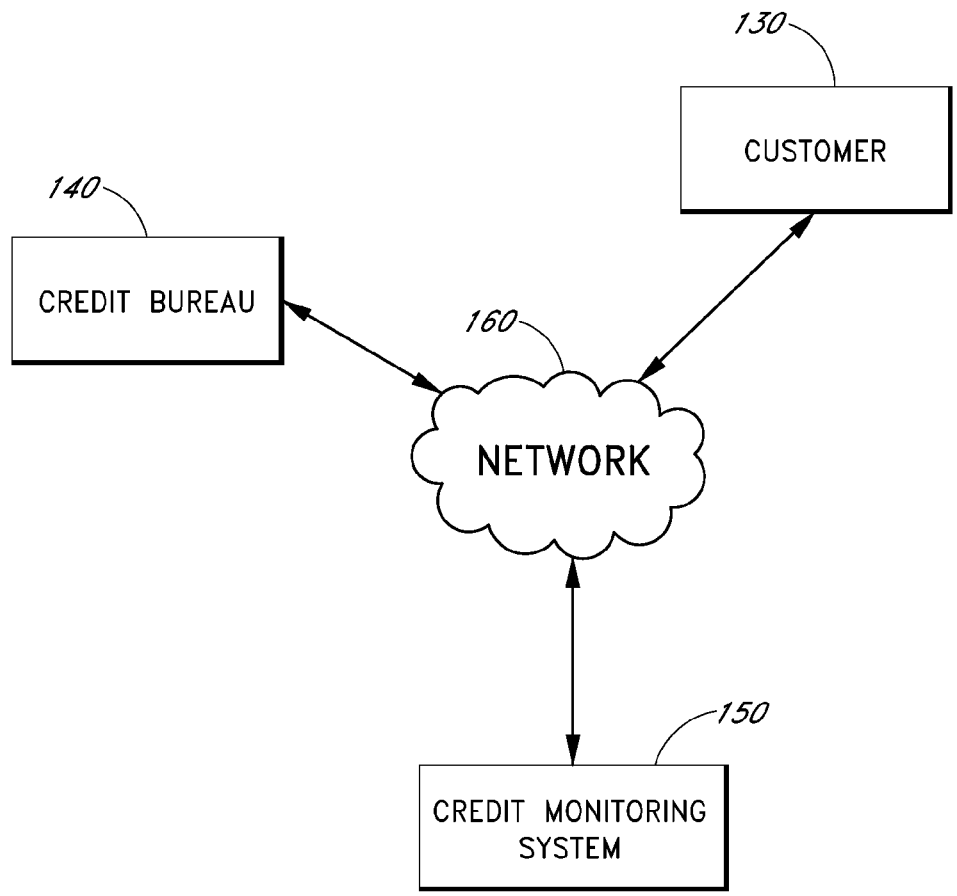
FIG. 1A is a block diagram illustrating one embodiment of a credit monitoring system in communication with a customer computing device and a credit bureau via a network.

FIG. 1A is a block diagram illustrating one embodiment of a credit monitoring system 150 in communication with a customer computing device 130 (also referred to herein as simply a "customer 130") and a credit bureau 140 via a network 160. In embodiment of FIG. 1, the credit monitoring system 150 receives information from the customer 130 regarding one or more minors of which the customer is a legal guardian. As used herein, the terms "minor" and "child," and the plural forms thereof, refer to persons that have not reached an adult age, which is typically 18 years old, but may be another age, such as 16, 17, or 21, for example. Thus, reference to a "child" or "minor" may refer to any age of child, from a newborn to a teenager that is about to turn 18. In the embodiment of FIG. 1A, the customer 130 is any legal guardian of a child that is to be enrolled in an identity monitoring service, such as the father, mother, guardian at litem, or other authorized guardian of the child. Advantageously, the credit monitoring system 150 communicates with the credit bureau 140, such as on a monthly basis, in order to retrieve credit-related data of the minor and to report possible fraudulent use of the minor's identity to the customer 130. As used herein, credit data is defined to include any credit-related data, including data from credit files, credit reports, and/or any other credit-related information. For ease of description, certain exemplary systems and methods are described herein with reference to credit files. These references to a credit file should be interpreted to include embodiments directed to any subset of credit data in a credit file, such as a credit report and/or soft inquiry data, or any additional credit data that may not be included in a credit file.

In one embodiment, the credit monitoring system 150 communicates with a provider of debit data (not shown) in order to retrieve debit-related data of the minor on a periodic basis, which may also be used to identify possible fraudulent use of the minor's identity. For ease of description, the systems and methods herein are described with specific reference to credit data; however, these systems and methods may supplement, or replace, credit data with any available debit data. In other embodiments, the credit monitoring system may communicate with the credit bureau 140 more or less frequently, such as hourly, daily, weekly, or quarterly, for example. Depending on embodiment, the network 160 may comprise one or more wired and/or wireless networks, such as one or more LANs, WANs, MANs, and/or the Internet.

Figure 1B:
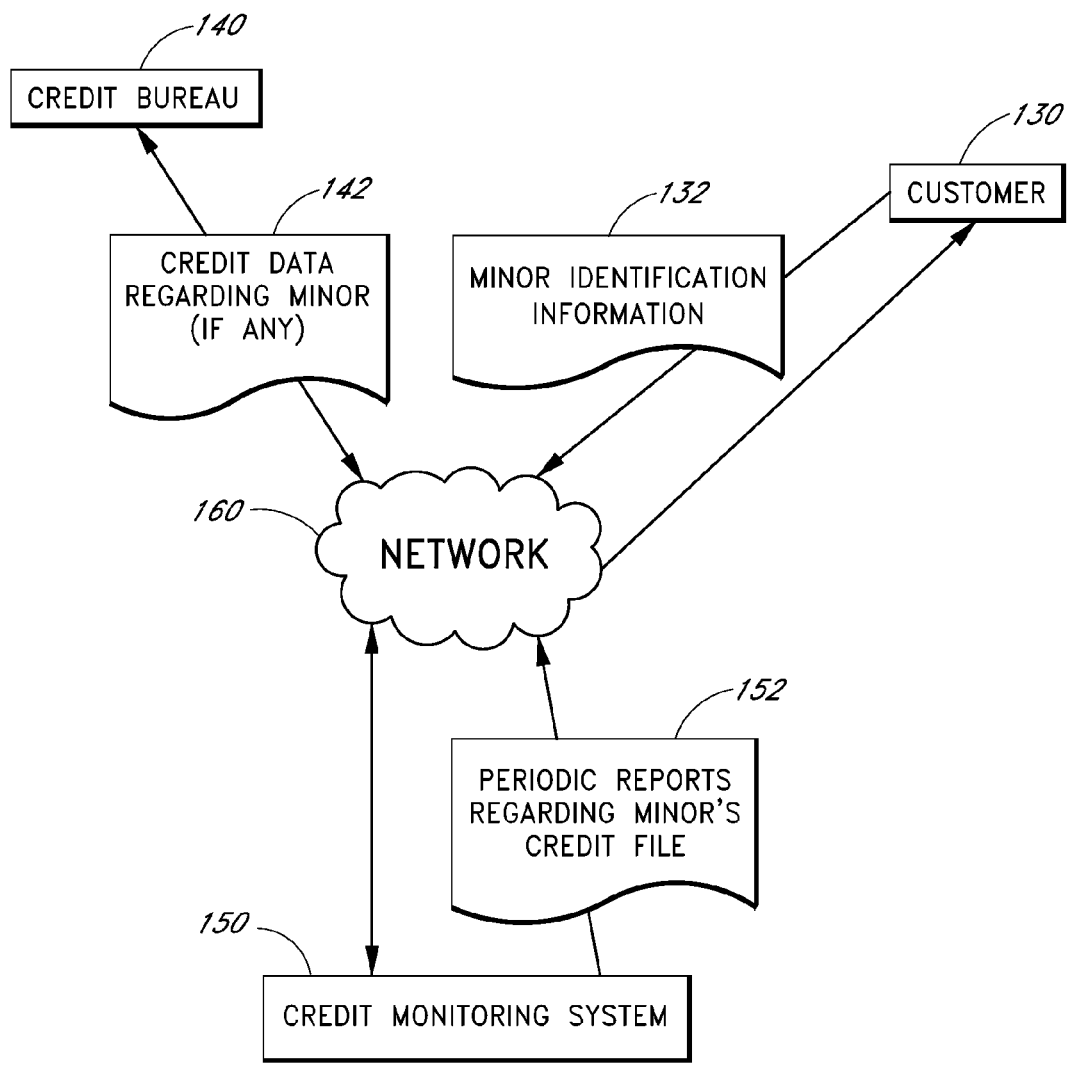
FIG. 1B is a block diagram illustrating one embodiment of the credit monitoring system of FIG. 1A, wherein information that is communicated between the credit monitoring system, the customer, and the credit bureau is also indicated.

FIG. 1B is a block diagram illustrating one embodiment of the credit monitoring system 150 of FIG. 1A, wherein information that is communicated between the credit monitoring system 150, the customer 130, and the credit bureau 140 is also indicated. In the embodiment of FIG. 1B, the customer 130 provides minor identification information 132 to the credit monitoring system 150 via the network 160. For example, the parent of a 13-year-old son may provide the name and Social Security number of the son to the credit monitoring system 150 via Internet communications. As is illustrated in FIGS. 4, 5, 7, and 8, one or more user interfaces may be provided by the credit monitoring system 150 via the network 160 for providing and receiving information to/from the customer 130.

As illustrated in FIG. 1B, the credit monitoring system communicates with the credit bureau 140, which may comprise one or more of Experian, TransUnion, Equifax, any agency thereof, or any other entity that provides credit-related data, in order to receive credit data 142 regarding the minor. Typically, a minor will not have a credit file with the credit bureau 140 unless and until credit-related activities have been performed in the name of the minor. For example, most 10 year old children do not have a credit file. Accordingly, the credit data 142 may comprise information indicating that no credit file for the requested minor was located by the credit bureau 140.

Upon receiving the credit data 142, the credit monitoring system 150 determines if a potentially fraudulent activity alert (referred to herein as simply an "Alert") should be transmitted to the customer 130. For example, an alert may be triggered in response to one or more of the following activities in a minor's credit file:

1. a credit account is currently open or was previously opened/closed
2. a credit inquiry was made in the past
3. a lien or bankruptcy filing exists
4. a vehicle is currently registered to the minor's identity
5. a bank previously made a deposit account inquiry
6. a medical collections account exists In one embodiment, the credit monitoring system 150 transmits periodic reports 152 regarding the minors credit data to the customer 130. As discussed further below, depending on the embodiment the reports may be transmitted in various manners. In one embodiment, for example, the customer 130 may receive a periodic email, such as daily, monthly, quarterly, etc., indicating whether or not new potentially fraudulent activity was located for their child or children. In one embodiment, the customer 130 may contact a fraud resolution specialist in order to receive guidance in having fraudulent activities removed from their children's credit data, such as their children's credit files.

A. System Information

In one embodiment, the customer computing device 130 comprises a notebook, desktop, or handheld computer, for example, running any available operating system. As illustrated in FIG. 1B, the customer 130 may communicate with the credit monitoring system via the network 160. The credit monitoring system 150, which may comprise one or more web interfaces that interact with the customer 130, is operated by a monitoring provider. The monitoring system may further comprise human personnel, such as fraud resolution agents, that interact with the computing device(s) of the monitoring system.

Figure 2:
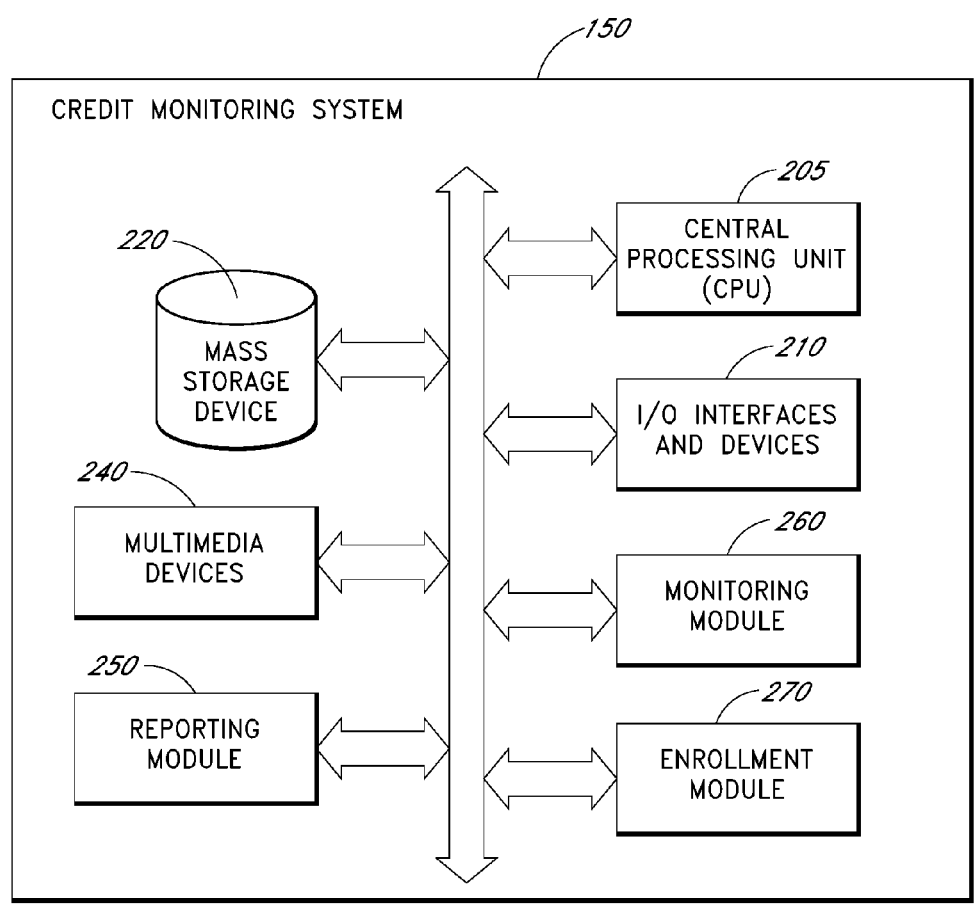
FIG. 2 is a block diagram illustrating one embodiment of the credit monitoring system of FIGS. 1A and 1B.

FIG. 2 is a block diagram illustrating one embodiment of the credit monitoring system 150, also referred to herein as simply the "monitoring system 150" or the "system 150." In one embodiment, the monitoring system 150 is configured to interface with multiple devices and/or data sources, such as in the exemplary network configuration of FIGS. 1A and 1B. The monitoring system 150 may be used to implement certain systems and methods described herein. For example, in one embodiment the monitoring system 150 may be configured to periodically request a credit file associated with one or more minors from one or more credit bureaus, compare the received credit file, if any, with one or more previously received credit files associated with respective of the minors, and determine if potentially fraudulent activity associate with respective minors has occurred. The functionality provided for in the components and modules of the monitoring system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the monitoring system 150 comprises, for example, a server or a personal computer that is IBM, Macintosh, or Linux/Unix compatible. In another embodiment, the monitoring system 150 comprises a laptop computer, smart phone, personal digital assistant, or other computing device, for example. In one embodiment, the exemplary monitoring system 150 includes a central processing unit ("CPU") 205, which may include one or more conventional microprocessors. The monitoring system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 stores the minor identification information 132 from each of a plurality of customers 130. Typically, the modules of the monitoring system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The monitoring system 150 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the monitoring system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary monitoring system 150 includes one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The monitoring system 150 may also include one or more multimedia devices 240, such as speakers, video cards, graphics accelerators, and microphones, for example. In one embodiment, the I/O interfaces and devices 210 comprise devices that are in communication with modules of the monitoring system 150 via a network, such as the network 160 and/or any secured local area network, for example.

In the embodiment of FIG. 2, the I/O devices and interfaces 210 provide a communication interface to various external devices. For example, the monitoring system 150 is in communication with the network 160 (FIGS. 1A and 1B), such as any combination of one or more LANs, WANs, or the Internet, for example, via a wired, wireless, or combination of wired and wireless, connections via a network interface of the I/O devices and interfaces 210.

In the embodiment of FIG. 2, the monitoring system 150 also includes application modules that may be executed by the CPU 205. More particularly, the application modules include an enrollment module 270, a monitoring module 260, and a reporting module 250. In general, the enrollment module 270 is configured to interact with legal guardians of minors in order to request and receive enrollment information from the legal guardians. The monitoring module 260 determines if credit files for respective enrolled minors exist and monitors any credit files of the enrolled minors, such as via periodic requests for credit files and comparison of certain credit data returned, in order to determine if potentially fraudulent activity associated with the minor has occurred. The reporting module 250 provides information regarding the monitoring of potential identity misuse for children that are enrolled in the identity monitoring service. Each of these modules is discussed in further detail below with reference to exemplary embodiments. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

B. Overall Process Flow

Figure 3:
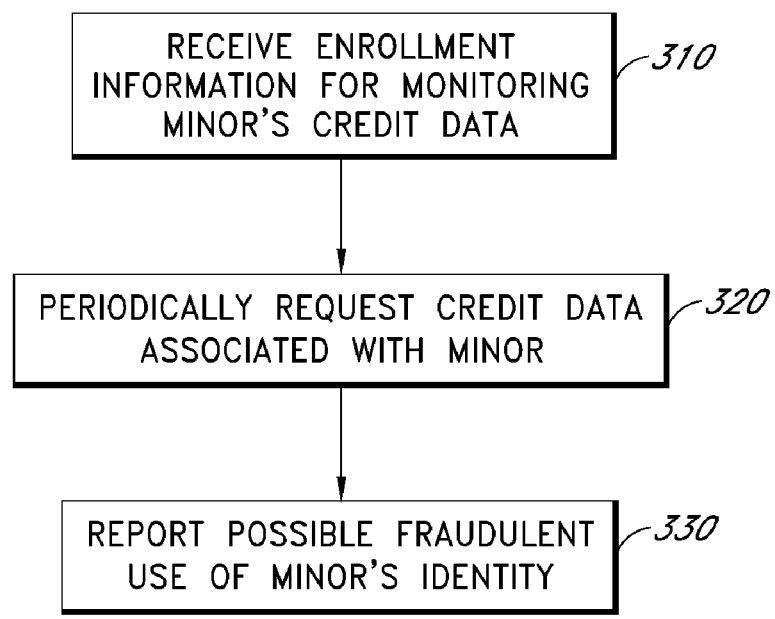
FIG. 3 is a flowchart illustrating one embodiment of a method of enrolling a minor in an identity monitoring service and periodically providing reports of potentially fraudulent activities associated with the minor.

FIG. 3 is a flowchart illustrating one embodiment of a method of enrolling a minor in an identity monitoring service and periodically providing reports of possible fraudulent activities associated with the minor to the legal guardian that enrolls the minor. Depending on the embodiment, the method of FIG. 3 may include fewer or additional blocks and the blocks may be performed in an order that is different than illustrated in FIG. 3.

Beginning in block 310, enrollment information for one or more minors is received by the monitoring system 150. After authentication of the enrollment information supplied by the respective legal guardians of the minors, the monitoring system requests credit data, such as credit reports and/or other credit data in credit files, for the enrolled minors from a credit bureau or other entity that maintains personal credit-related information. In one embodiment, credit data for the minors is requested on a periodic basis, such as bi-weekly or monthly, for example. In block 330, certain activities related to the minors' credit data, if any, are categorized as possibly fraudulent use of the minors' identity and, thus, result in an Alert being provided to the respective legal guardians indicating that potential fraudulent activity has occurred. For example, possible fraudulent activity may be suspected when credit data comprising a credit file is first returned for a minor and/or when there is some activity (e.g., month over month) within at least a predetermined subset of segments of a particular minor's credit file.

C. Enrollment

In one embodiment, the enrollment module 270 is configured to interact with each of a plurality of customers 130 in order to receive information that authenticates the customer as a legal guardian of one or more minors and enrolls the minors in the child identity monitoring service that is provided by the credit monitoring provider. In one embodiment, a legal guardian may initially enroll themselves in a credit monitoring service, such as Experian's Triple Advantage$^{SM}$ Credit Monitoring, for example, via a web interface in communication with a credit monitoring computing device. The enrolled legal guardian, who is then a member of the credit monitoring service, may indicate that identity monitoring services for a minor, e.g., a child under the age of 18, are desired. The monitoring services for the legal guardian and the enrolled children may be based on credit data received from only a single credit bureau, from multiple credit bureaus, and/or from credit bureaus, debit data providers, and/or other credit or debit data providers. In one embodiment, after completing enrollment and authentication, the member may select a prominently positioned link in the member area of the website in order to retrieve a user interface that initiates enrollment of one or more minors in a child identity monitoring service. In other embodiments, legal guardians that are not members of a credit monitoring service themselves may also enroll their children in an identity monitoring service, wherein the enrollment may require additional information regarding the legal guardian that would not be required if the legal guardian was already enrolled in a related service offered by the monitoring provider.

Figures 4, 4A:
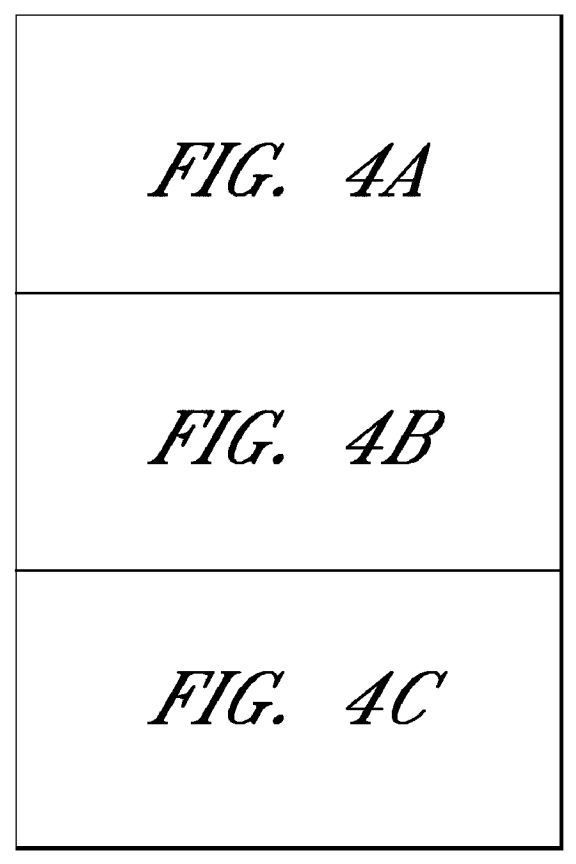

FIG. 4 illustrates one embodiment of a user interface 400 for enrolling minors in an identity monitoring service. As noted above, an enrollment interface, such as interface 400 of FIG. 4 may be provided to a legal guardian in response to the legal guardian selecting a link to register minors in an identity monitoring service. In embodiment of FIG. 4, first information 410 regarding a first child has already been entered into the interface 400. In particular, the first name, last name, Social Security number, and date of birth for the first child have been entered into the interface 400, and the entered information will be transmitted to the credit monitoring system 150 in response to selection of the submit update button 440 by the legal guardian. As illustrated in the embodiment of FIG. 4, the user interface 400 requires the legal guardian to enter the Social Security number for each child twice, in order to reduce typographical errors in entering the Social Security numbers. In one embodiment, a child may not be enrolled in the identity monitoring service until an identical Social Security number is entered into both the Social Security number input box 412 and the confirmed Social Security number input box 414. In one embodiment, more than five minors may be added to a single identity monitoring account of a legal guardian, such as via a user interface similar to interface 400 and/or via oral or written communication between the legal guardian and a customer service representative of the monitoring provider.

The exemplary enrollment form 400 comprises an authentication field 420 comprising certification information 424 and a checkbox 422 that the legal guardian may check upon reviewing and agreeing with the certification information 424. In the embodiment of FIG. 4, the exemplary certification information 424 states:

I hereby certify that I am the parent or guardian of the child(ren) named above, that I am enrolling the child (ren) named above in ChildSecure™, that I understand and agree that enrollment may require ConsumerInfo-.com, Inc. to obtain information about the child(ren) named above from a credit reporting company, and that any information about the child(ren) named above that I obtained from ConsumerInfo.com, Inc. will be used solely for the purposes of protecting against or preventing actual or potential fraud with respect to the child (ren) named above.

In other embodiments, the certification information 424 may comprise additional or fewer terms. In one embodiment, when the certification checkbox 422 has been checked by the legal guardian, the monitoring system 150 presumes that the legal guardian truly is the legal guardian of the child, without requiring any further authentication. However, in certain embodiments additional authentication information is required before actual credit data (or debit data in an embodiment that accesses debit data) is provided to the legal guardian. For example, in one embodiment the legal guardian may be required to provide additional information regarding him/ herself and/or the child in order to be authenticated to receive information regarding specific activity indicated in the child's credit data.

In one embodiment, rather than, or in addition to, the certification checkbox 424, the certification statement may be signed electronically, such as by the member typing their name into a text-entry field of a web interface and/or transferring a unique signature identifier and/or file to the monitoring system 150. In other embodiments, the signature may be inked on a printed document that is mailed, scanned and emailed, or faxed, for example, to the monitoring provider.

Depending on the embodiment, additional or less information associated with each minor may be required in the enrollment process. In one embodiment, the enrollment module 270 authenticates that the child is in fact a minor (e.g., less than 18 years of age) using a date of birth (DOB) of the child that is entered by the guardian and in real-time calculating whether that DOB is less than 18 years in the past by comparing the date of birth to the current day and year.

D. Identity Monitor Reporting

FIG. 5 illustrates one embodiment of a user interface 500 comprising a status pane 510 that includes information regarding each minor enrolled in the identity monitoring service that is associated with a particular legal guardian 130. In this embodiment, the status pane 510 indicates a current status of each of the minors that have been submitted for enrollment in the identity monitoring service and a status key pane 520 that provides an explanation of each possible status indicator. In exemplary user interface 500, the status pane 510 indicates that the minor "John Smith" has a current status of "processing." The status key pane 520 indicates that the status indicator "processing" indicates that "Your request is currently being processed. It may take up to 48 hours to conduct our initial search. Please check back soon." The status key pane 520 also provides explanations for the status indicators "ALERT", "No Activity Detected", and "No New Activity Detected," which will each be discussed in further detail below.

Following authentication of the member as the legal guardian of the minor, the monitoring system 150 performs a periodic monitoring of credit data associated with the minor, if any, and determines if potentially fraudulent activity has occurred. Depending on the embodiment, reports to the legal guardian of one or more enrolled minors may be delivered via email, SMS messages, voicemails, offline delivery (e.g., mail or fax), or other suitable communication means. In one embodiment, for example, a status email is transmitted to the legal guardian each month, reporting whether new activity associated with their registered minor(s) credit file has been detected, and providing the legal guardian information regarding resolving any problems with the minor's credit file.

E. Identity Monitoring

Figure 6:
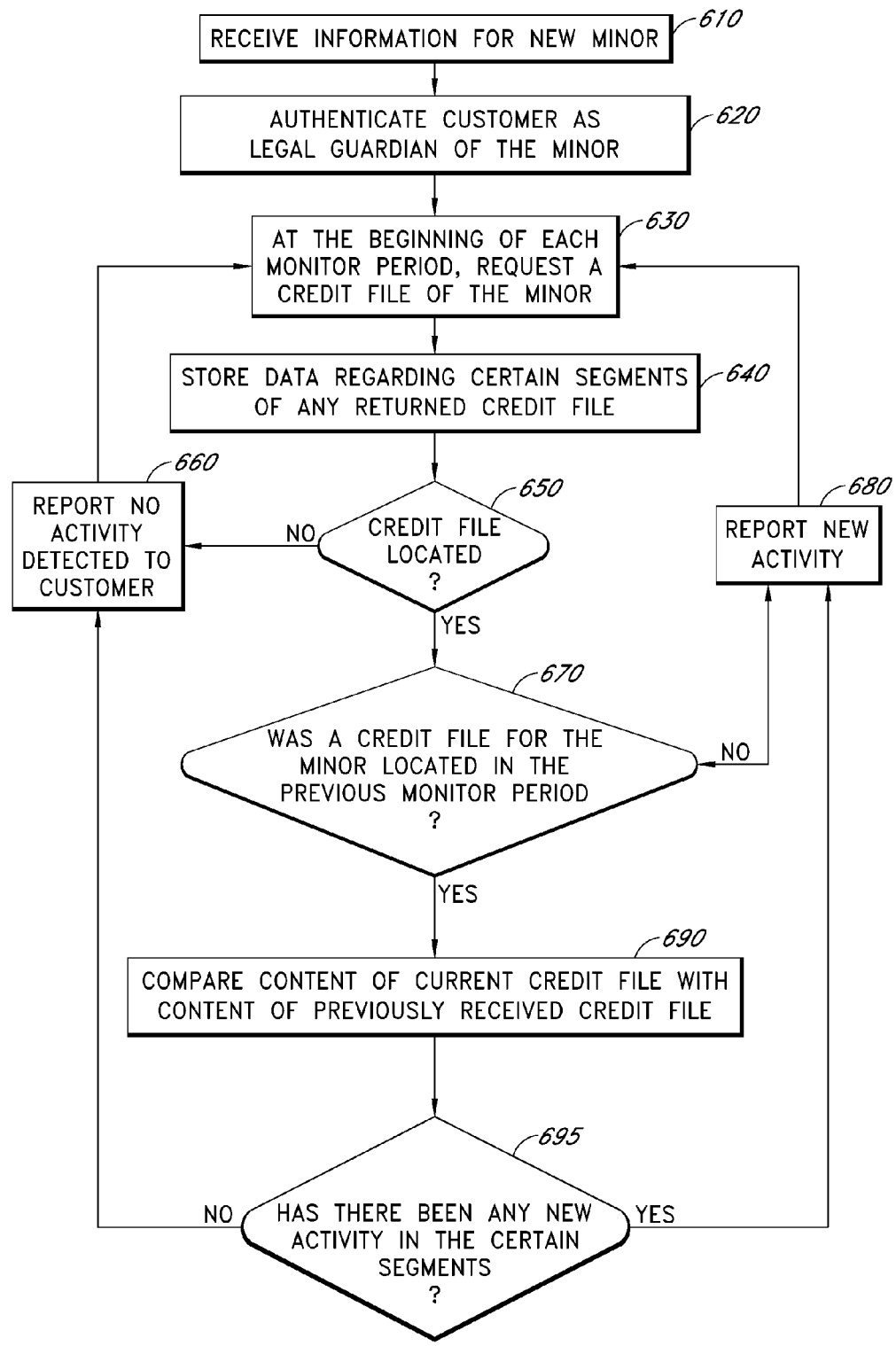
FIG. 6 is a flowchart illustrating one embodiment of a method of monitoring a minor's identity for potentially fraudulent use.

FIG. 6 is a flowchart illustrating one embodiment of a method of monitoring a minor's identity for potentially fraudulent activity. Depending on the embodiment, the method of FIG. 6 may include fewer or additional blocks and the blocks may be performed in a different order than is illustrated.

Beginning in block 610, the credit monitoring system 150 receives information identifying a minor that is to be added to the identity monitoring service. In one embodiment, the minor information comprises a first and last name, address, social security number, and/or other identifying information. As noted above with reference to FIG. 4, the minor information may be provided to the monitoring system 150 via one or more web interfaces. In other embodiments, the minor information is provided via other suitable communication mediums, such as orally to a representative of the monitoring provider, via a fax, email, SMS message, or other electronic communication, or via a printed correspondence. In one embodiment, a user interface provides the legal guardian with means to remove an enrolled child from the identity monitoring service, such as when the legal guardian is no longer a legal guardian of the enrolled child. For example, in one embodiment a checkbox labeled "remove" or the like may be included next to each enrolled child and be configured to initiate removal of the child from the identity monitoring service when selected.

Moving to block 620, the legal guardian that is requesting enrollment of the minor in the credit monitoring service is authenticated as a legal guardian of the minor. Any suitable authentication means may be used in order to determine that the legal guardian truly is a legal guardian of the minor. In one embodiment, the legal guardian is required to sign or affirmatively indicate agreement to a statement that the legal guardian truly is the legal guardian of the minor (e.g., by checking the certification box 422 of user interface 400). In other embodiments, additional authentication procedures, such as comparison of addresses associated with the legal guardian and the minor, are performed prior to enrolling a minor in the credit monitoring service.

Next, in block 630 a credit file and/or other credit data, for the enrolled minor is requested at the beginning of each monitor period, where the monitor period may be any predetermined time period, such as weekly, bi-weekly, monthly, quarterly, etc. Thus, a monthly monitoring service would request a credit file for the enrolled minor once each month. In one embodiment, when a minor is first enrolled in the credit monitoring service, the monitoring system 150 substantially immediately sends a first request for a credit file for the minor. In this embodiment, a subsequent request would be transmitted on the same day (or next working day thereof) of each subsequent month. For example, if Jimmy Jones is enrolled in the credit monitoring service (by his legal guardian) on Jun. 13, 2008, a first credit file associated with Jimmy may be requested within a few hours to days of his enrollment. A credit file may be requested again on July 13, August 13, September 13, etc. In another embodiment, credit files for enrolled minors may be requested in batches, such as all on a certain day of the month (e.g., the $1^{st}$ of each month) or all of the minors associated with a particular legal guardian on the same day (e.g., credit files for Jimmy and his four sibling that are enrolled in the service may be requested on the same date, even though they were enrolled on different dates.)

In one embodiment, credit requests sent from the monitoring system 150 comprise a find consumer search request that is transmitted to a consumer credit information provider, such as a credit bureau, for example. In one embodiment, the find consumer request is sent to Experian Information Services (EIS), which maintains publicly available records and credit details received from thousands of credit grantors and supplies comprehensive information on the credit status of individuals. In one embodiment, the credit information provider, such as EIS, returns to the credit monitoring system 150 either (1) an indication that no consumer file was found matching the minor or (2) a matching consumer file.

Moving to block 640, data regarding certain segments of any returned credit file are recorded for later reference, such as in the mass storage device 220 of the monitoring system 150 (FIG. 2). In one embodiment, the credit file includes data that is sorted into various segments, such as public record, tradeline, inquiry, employer, and address segments that each include different types of information. Depending on the embodiment, data associated with only a predetermined subset of segments is stored and analyzed in monitoring the minor's credit file. In one embodiment, information received in each of the above-listed segments is stored in block 640. If no credit file is returned, data indicating such is recorded.

In block 650, the credit monitoring system 150 determines if a credit file for the minor was returned. As noted above, many minors have not been personally involved in any credit-related activities and, thus, no credit file can be provided. If no credit file has been returned, the method continues to block 660 where a report that no activity was detected is transmitted to the associated legal guardian. For example, the reporting module 250 (FIG. 2) may transmit an email notification to the legal guardian indicating that there has been no activity in the minor's credit file. After the legal guardian is notified that no activity has been detected in the minor's credit file, the method returns to block 630 where credit data for the minor is again requested at the beginning of the next monitor period (e.g., one month later).

In the embodiment of FIG. 6, the minor has a monitoring status (or simply "status") that provides information regarding potential misuses of the minor's identity. In one embodiment, the statuses of each minor associated with a legal guardian are indicated in the status pane of a user interface that is accessible to the legal guardian. For example, FIG. 7 illustrates a status pane 710 listing three minors that are enrolled in the monitoring service and one minor for which the enrollment process has not been complete. In this embodiment, each of the minors has an associated monitoring status selected from the group comprising:

Processing: Indicates that enrollment of the minor has not yet been completed.

Alert: Indicates that a credit file for a monitored minor was identified for the first time in the current monitor period or that new information was found that did not exist in the previously returned credit file for the minor No Activity Detected: Indicates that no credit activity for the minor was detected.

No New Activity Detected: Indicates that the same information is present in both current and previous credit file for the minor.

In other embodiments, additional or fewer statuses may be associated with minors. For example, in one embodiment the statuses "No Activity Detected" and "No New Activity Detected" may be combined into a single status indicator.

In the embodiment of FIG. 7, both Jane and Jenna have a status of "No Activity Detected," indicating that no credit activity was reported for the girls, but John has a status of "Alert," indicating that a credit file was first returned in the current monitor period or that the current credit file for John has different information (e.g., could be either more or less information) than the previously received credit file for John. In this embodiment, the legal guardian is not provided details of the potentially fraudulent activity associated with the minor via the web interface, but is only provided with an indication (e.g., "Alert") that there has been some activity that should be addressed by the legal guardian. Thus, in this embodiment the legal guardian may contact a fraud resolution specialist in order to learn the reasons for the "Alert" and to work towards removing any fraudulent activity from the minor's credit file and/or other credit data. In other embodiments, additional information regarding reasons for changing a minor's status to "Alert" may be provided via an Internet-accessible interface.

Returning to block 660 of FIG. 6, if a credit file is returned to the credit monitoring system, the method continues to block 670 where the monitoring system 150 determines if, in the previous monitor period, a credit file was returned for the minor. In one embodiment, the monitoring module 160 (FIG. 2) accesses data stored after the previous credit file was requested (e.g., a month prior) in order to determine if a credit file was located in the previous monitor period. If a credit file was not located in the previous monitor period, the method continues to block 680 where an Alert notification is provided to the legal guardian, without necessarily looking at the details of the returned credit file. Thus, in the embodiment of FIG. 6, an "Alert" is sent to the legal guardian in response to the first indication that there is credit activity associated with a minor, regardless of what is in the returned credit file.

If the monitoring module 160 determines that a credit file for the minor was also returned in the previous monitor period, the method continues to block 690 where the content of the current and previous credit file are compared in order to determine if the minor's status should be set to "Alert" or "No New Activity Detected." In an advantageous embodiment, only certain segments of the credit file that have been determined to be most indicative of fraudulent use of a minor's identity are compared in block 690. For example, in one embodiment only public record, tradeline, inquiry, employer, and address segments of credit file are compared in block 690. In other embodiments, fewer or additional segments of credit file are compared. Additionally, in some embodiments the monitoring module 260 compares the current credit file to more than just the previous credit file, e.g., the last two, three, or more credit files may also be compared in block 690.

Moving to block 695, the monitoring module 260 determines if there has been any new activity in the segments of the credit file that are compared in block 690. For example, in one embodiment new activity comprises the addition or deletion of information in one of the predetermined segments. In one embodiment, addition or deletion of information is determined differently for each segment, such as according to the below comparison logic:

a. Public Record segment: Compare the Court Code and Reference Number—if not exact match on both, new activity is detected.

b. Tradeline segment: Compare the Date Opened, Account Number, and Subscriber name (or Subscriber Code)—If not exact match on all three, new activity is detected.

c. Inquiry segment: Compare the Inquiry date and Subscriber name (or Subscriber Code)—If not exact match on both, new activity is detected.

d. Employer segment: Compare the Employer name—if not exact match, new activity is detected.

e. Address segment: Compare the Address—if not exact match, new activity is detected.

In the embodiment of FIG. 6, if new activity has been detected, such as in response to one or more of the comparisons indicated above, the method continues to block 680 where an "Alert" is reported to the legal guardian. However, if no new activity is detected, e.g., the content of the selected segments is substantially the same as the previous month, the method continues to block 660 where a "No Activity Detected" is reported to the legal guardian. Thus, in the embodiment of FIG. 6, the "No Activity Detected" indicates either that no credit file was located in the current period (e.g., from block 650) or that no new activity was detected in the returned credit file (e.g., from block 695). In certain embodiments, the status for a minor that has a current credit file with no new activity is "No New Activity Detected," while "No Activity Detected" is reserved to indicate that no credit file was returned in the current period. In other embodiments, fewer or additional Alerts may be used in order to communicate monitoring statuses to legal guardians.

FIG. 8 illustrates a user interface 800 that provides information regarding what can be done by the legal guardian in response to receiving an alert notification from the monitoring system 150, e.g., as indicated in a periodic status reporting email and/or as indicated in a status pane of an Internet-accessible user interface. In one embodiment, additional authentication of the legal guardian is required before further information, e.g., beyond the status of the enrolled minor(s), is provided. In one embodiment, for example, submission of a certification form signed by the legal guardian, such as the exemplary certification form of FIG. 9, may be required. Additionally, in some embodiments, legal documents, such as the minor's birth certificate, the minor's social security card, the legal guardian's driver's license or other government-issued identification, and/or documentation verifying the address of the legal guardian, such as a recent utility bill, may also be required in order to certify the legal guardian to receive further information regarding the minor's credit file and to take steps to correct any fraudulent activity associated with the credit file.

In one embodiment, when an Alert is reported to the legal guardian, the legal guardian is invited to call a dedicated Fraud Resolution Center (FRC) agent to obtain further information and support. In one embodiment, contact information for one or more dedicated child identity monitoring FRC agents is/are provided to the legal guardian as part of the identity monitoring service.

In one embodiment, the FRC agent initially requests documents and information for certifying the legal guardian, such as the documents described above. In one embodiment, the FRC manually authenticates the legal guardian utilizing the received paper documents. As noted above in the discussion of enrollment procedures, in certain embodiments, if the adult member's address (or other information) does not match the minor's address (or other information) the same or similar offline authentication process may be required prior to executing the initial identity monitoring on the minor. In one embodiment, the FRC agent communicates with the legal guardian via email and reviews activity in child's file to determine corrective action required In one embodiment, regular communications may be established between the legal guardian and the FRC agent such that the legal guardian is regularly updated as to the status of the investigation (e.g., the FRC agent may have a dedicated phone number, email address, etc. that the legal guardian can easily contact and consult with agent). In one embodiment, the monitoring services described above are offered in conjunction with a family identity theft coverage, such as a guarantee or insurance. If the minor is enrolled in such coverage, the FRC may work with the legal guardian in order to file a claim to recover damages incurred.

F. Exemplary Credit-Related Activity and Reporting

FIG. 10 is a table illustrating certain credit-related activities associated with three exemplary minors over a nine-month time period, as well as the statuses associated with each of the minors during that time period. In particular, column 1005 lists nine months, from month 1 to month 9, section 1010 comprises data associated with a minor Tommy Smith during those nine months, and columns 1020 and 1030 comprise data associated with siblings Billy and Sara Jones, respectively, during those nine months. Additionally, column 1040 indicates a report that is given to the legal guardian of both Billy and Sara over the nine month period, based on the exemplary activity indicated for Billy and Sara in FIG. 10. In this embodiment, the monitor period is one month.

With reference to Tommy (section 1010), in month 1 he is enrolled in the identity monitoring service and the initial credit request does not return a credit file (as indicated by the "No Activity Detected" status). However, in month 2 a credit file is returned indicating that an American Express credit card was issued in Tommy's name. Thus, because a credit file was returned in month 2, where no credit file was located in month 1, the status for month 2 is changed to Alert. As noted above, in one embodiment the content of the status report in month 2 is not important in determining that the status should be changed to Alert, as the appearance of a credit file in the credit data where there was not one the previous month is sufficient to trigger an Alert. The Alert status for Tommy may be indicated in a status pane that is accessible to the legal guardian of Tommy on a website provided by the monitoring system 150 and/or may be indicated in an email, or other communication, to the legal guardian. Depending on the embodiment, the legal guardian may be required to provide further certification information, such as legal documents associated with Tommy and/or the legal guardian, before the details of the alert (e.g., that a credit file was located and the content of the credit file) are provided to the legal guardian.

Moving to month 3, a credit file for Tommy was returned, but it only indicated the same American Express credit card that was included on the credit file from month 2. Accordingly, the status indicator for month 3 is changed to "No New Activity Detected," indicating that there was a credit file returned that included only the same information as in the previous credit file in at least the predetermined segments that are monitored. In month 4, a credit file for Tommy was returned indicating the same American Express credit card and a new address associated with the minor. A "new address" activity may be triggered, for example, if the address for a currently open account, such as the American Express credit card that is enrolled in Tommy's name, has changed or a new account (of any type) is opened with a different address. Because the new address was not included in the month 3 credit file, the new activity results in the status for Tommy being returned to "Alert" for month 4. Moving to month 5, the credit file for Tommy again includes the American Express credit card, but the address that was included in the month 4 report was no longer included and a new hospital collections account was newly reported in the month 5 report. Thus, both the removal of the new address and the addition of the hospital collections account for the first time on the current report causes the month 5 status to be set to "Alert." In month 6, the hospital collections account is no longer part of Tommy's credit file and, thus, the removal of the account causes the status to remain set to "Alert." In month 7, another credit card, a VISA credit card, is found on Tommy's credit file, in addition to the preexisting American Express credit card. The new VISA credit card, which wasn't on the credit file for the previous month causes the status to again remain set at "Alert." In month 8, no credit file is returned for Tommy. His legal guardian has worked with a fraud resolution specialist to remove the fraudulent activity from his credit file, and hopefully prevent further fraudulent activity using Tommy's identity. However, in month 9, a credit file for Tommy is again located with a new Mastercard credit card, setting the status back to "Alert."

In the embodiment above, Tommy's legal guardian may have the opportunity, such as at the time of enrolling Tommy in the identity monitor service, to select one or more methods of receiving status notifications from the monitoring system 150. For example, Tommy' legal guardian may choose not to have emails or other messages sent to him reporting Tommy's status, but rather to receive information regarding his status when Tommy's legal guardian periodically logs into a website provided by the monitoring system and views a status pane indicating the current status of Tommy's identity monitoring. In one embodiment, Tommy's legal guardian may choose to have an email and/or SMS message sent to them after each credit file request, whenever Tommy's status changes, or possibly only when Tommy's status changes to Alert.

With reference to Billy and Sara Jones, Billy is enrolled in the identity monitoring service in month 2 and does not have a credit file for any of months 2 through 9. Sara Jones was enrolled in month 4 and has a credit file in month 6, triggering an Alert for Sara. In one embodiment, a single report is sent to Mr. Jones, who is the legal guardian of Billy and Sara, indicating whether any of the enrolled children have an alert for the current period or if all of the children have either No Activity or No New Activity. For example, the report sent to Mr. Jones in month 4 may indicate that neither of the Jones children have Alerts, while the report in month 5 may simply indicate that at least one of the Jones children has an Alert, without indicating which of the children has an Alert or details of the Alert. For months 7-8, the credit file for Sara included the same address as was originally located in month 6, and no other new activity in the monitored segments. Accordingly, the report to Mr. Jones may indicate that there are no new Alerts in months 7-8. In month 9, no report is returned for Sara and the report sent to Mr. Jones indicates that no activity has been detected for either of his enrolled children.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A computerized method of monitoring unauthorized use of a child's identity comprising:
   receiving, by a computing device, personally identifying information associated with a child, the personally identifying information comprising one or more of: a name, an address, at least a portion of a social security number, and a maiden name of the child's mother;
   receiving, by the computing device, an electronic certification from a legal guardian of the child certifying that the legal guardian truly is the legal guardian of the child; and
   periodically providing information to the legal guardian regarding the presence or absence of potentially fraudulent activity associated with the child, wherein the periodically providing comprises performing the following method on a periodic basis:
      receiving, by the computing device, credit information associated with the child;
      determining, by the computing device, if the credit information associated with the child indicates, in one or more of a public record, a tradeline, and a credit inquiry portions of the credit information, no activity associated with the child, new activity that was not indicated in credit information previously received for the child, or the same activity that was also indicated in credit information previously received for the child;
      in response to determining that the credit information associated with the child indicates no activity associated with the child, transmitting, by the computing device, an electronic communication to the legal guardian indicating that no activity has been detected;
      in response to determining that the credit information associated with the child indicates new activity that was not indicated in credit information previously received for the child, transmitting, by the computing device, an electronic communication to the legal guardian indicating that potentially fraudulent activity has been detected; and
      in response to determining that the credit information associated with the child indicates only the same activity that was also indicated in credit information previously received for the child, transmitting, by the computing device, an electronic communication to the legal guardian indicating that no new activity has been detected.

2. The computerized method of claim 1, wherein the credit information associated with the child comprises:
   an indication that no credit file was located for the child; or
   information contained in a credit file located for the child.

3. The computerized method of claim 1, wherein the credit information associated with the child is requested monthly and the electronic communication comprises an email.

4. The computerized method of claim 1, wherein the electronic certification comprises a checkbox on an Internet-accessible form that must be selected by the legal guardian in order to certify that the legal guardian truly is a legal guardian of the child.

5. The computerized method of claim 1, wherein the electronic certification comprises an electronic signature of the legal guardian.

6. A child fraud monitoring system comprising:
   a computer processor configured to execute modules comprising at least:
      an enrollment module configured to receive personally identifying information associated with a child and an electronic certification from a legal guardian of the child certifying that the legal guardian truly is the legal guardian of the child, the child personally identifying information comprising one or more of: a name, an address, at least a portion of a social security number, and a maiden name of the child's mother;
      a monitoring module configured to periodically receive credit information associated with the child and determine if the credit information associated with the child indicates, in one or more of a public record, a tradeline, and a credit inquiry portions of the credit information, no activity associated with the child, new activity that was not indicated in credit information previously received for the child, or the same activity that was also indicated in credit information previously received for the child; and
      a reporting module configured to periodically provide information to the legal guardian regarding the presence or absence of potentially fraudulent activity associated with the child by processing the credit information periodically received by the monitoring module, wherein the processing comprises:
         in response to the monitoring module determining that the credit information associated with the child indicates no activity associated with the child, transmitting an electronic communication to the legal guardian indicating that no activity has been detected;

in response to the monitoring module determining that the credit information associated with the child indicates new activity that was not indicated in credit information previously received for the child, transmitting an electronic communication to the legal guardian indicating that potentially fraudulent activity has been detected; and in response to the monitoring module determining that the credit information associated with the child indicates only the same activity that was also indicated in credit information previously received for the child, transmitting an electronic communication to the legal guardian indicating that no new activity has been detected.

7. The child fraud monitoring system of claim 6, wherein the credit information associated with the child comprises:
   an indication that no credit file for the child was located; or
   information of a located credit file.

8. The child fraud monitoring system of claim 6, wherein the credit information associated with the child is requested monthly and the electronic communication comprises an email.

9. The child fraud monitoring system of claim 6, wherein the electronic certification comprises a checkbox on an Internet-accessible form that must be selected by the legal guardian in order to certify that the legal guardian truly is a legal guardian of the child.

10. The child fraud monitoring system of claim 6, wherein the electronic certification comprises an electronic signature of the legal guardian.

* * * * *

UNITED STATES PATENT AND TRADEMARK OFFICE
CERTIFICATE OF CORRECTION

| | | |
|---|---|---|
| PATENT NO. | : 7,841,004 B1 | Page 1 of 1 |
| APPLICATION NO. | : 12/718936 | |
| DATED | : November 23, 2010 | |
| INVENTOR(S) | : Balducci et al. | |

It is certified that error appears in the above-identified patent and that said Letters Patent is hereby corrected as shown below:

In Col. 13, line 41, after "required" insert --.--.

In Col. 16, line 45, Claim 6, before "personally" delete "child".

Signed and Sealed this
Fifth Day of July, 2011

David J. Kappos
*Director of the United States Patent and Trademark Office*